(12) United States Patent
Shields et al.

(10) Patent No.: US 8,280,765 B2
(45) Date of Patent: Oct. 2, 2012

(54) METHOD AND APPARATUS FOR MAXIMIZING PUBLISHER REVENUE

(75) Inventors: Tom Shields, San Mateo, CA (US); C. Douglas Cosman, San Mateo, CA (US); Craig Miller, San Mateo, CA (US); John Barr, San Mateo, CA (US)

(73) Assignee: Yieldex, Inc., San Mateo, CA (US)

( * ) Notice: Subject to any disclaimer, the term of this patent is extended or adjusted under 35 U.S.C. 154(b) by 282 days.

(21) Appl. No.: 12/628,958

(22) Filed: Dec. 1, 2009

(65) Prior Publication Data
US 2011/0131099 A1 Jun. 2, 2011

(51) Int. Cl.
*G06Q 30/00* (2012.01)
(52) U.S. Cl. ...................................................... 705/14.1
(58) Field of Classification Search .................. 705/14.1
See application file for complete search history.

(56) References Cited

U.S. PATENT DOCUMENTS
2007/0174124 A1* 7/2007 Zagofsky et al. ............... 705/14
* cited by examiner

*Primary Examiner* — Daniel Lastra
(74) *Attorney, Agent, or Firm* — Womble Carlyle Sandridge & Rice, LLP

(57) ABSTRACT

A computer implemented method for maximizing publisher revenue for online advertising is provided. The computer implemented method includes determining a ratio of guaranteed ad impressions to expected remaining ad impressions. If the ratio is less than a threshold, the method includes, identifying a minimum bid value, the minimum bid value based on the ratio; comparing the minimum bid value to a received bid value for an ad impression; allocating the ad impression to an owner of the received bid when the received bid value is greater than or equal to the minimum bid value; and displaying an ad of the owner of the received bid. If the ratio is greater than the threshold, the method includes, allocating the ad impression to an owner of the guaranteed ad impressions. In one embodiment, the method operations are stored on a computer readable storage medium.

22 Claims, 5 Drawing Sheets

METHOD AND APPARATUS FOR MAXIMIZING PUBLISHER REVENUE

CLAIM OF PRIORITY

This application claims priority from U.S. patent application Ser. No. 11/743,962, filed on May 3, 2007, and entitled "NETWORK BASED SYSTEM AND METHODS FOR DEFINING AND MANAGING MULTI DIMENSIONAL, ADVERTISING IMPRESSION INVENTORY", which claims priority to U.S. provisional application Ser. No. 60/798,021 filed May 5, 2006, each of which are hereby incorporated by reference.

BACKGROUND

Advertising on the Internet continues to grow at a rapid pace. As in other advertising mediums, the amount of advertising inventory available in a given period of time is finite. Contracts are created between advertisers and publishers that specify a particular market segment, range of dates for publication of their advertisements, and an advertising goal, translate into a certain quantity of the available inventory. Many of the contracts compete for the same limited inventory of advertising products. Managing the overlap of market segments has been previously discussed in U.S. patent application Ser. No. 11/743,962, the contents of which are herein incorporated by reference for all purposes.

The advertising inventory, sometimes referred to as advertising impressions being viewed on an Internet site, includes premium advertising impressions and remnant advertising impressions. The premium advertising impressions, also referred to as guaranteed impressions, are typically sold for a much higher price per impression than the remnant impressions. U.S. patent application Ser. No. 11/743,962 deals with the distribution of the premium advertising impressions so as to fulfill contractual obligations among competing segments. However, the distribution and management of the remnant advertising impressions is not addressed. In most instances, the remnant advertising impressions count for a majority of the total advertising impressions provided by a publisher, and the price is not set as with the premium advertising impressions. Thus, any increase in the revenue generated from the remnant advertising impressions is compounded as a result of the overweight nature of the remnant advertising impressions in the total advertising impressions.

It is within this context that the invention arises.

SUMMARY

Embodiments of the present invention include a method and apparatus for maximizing publisher revenue. It should be appreciated that the present invention can be implemented in numerous ways, such as a process an apparatus, a system, a device or a method on a computer readable medium. Several inventive embodiments of the present invention are described below.

In one embodiment, a computer implemented method for maximizing publisher revenue for targeted advertising is provided. The computer implemented method includes determining a ratio of guaranteed ad impressions to expected remaining ad impressions. If the ratio is less than a threshold, the method includes, identifying a minimum bid value, the minimum bid value based on the ratio; comparing the minimum bid value to a received bid value for an ad impression; allocating the ad impression to an owner of the received bid when the received bid value is greater than or equal to the minimum bid value; and displaying an ad of the owner of the received bid. If the ratio is greater than the threshold, the method includes, allocating the ad impression to an owner of the guaranteed ad impressions. In one embodiment, the method operations are stored on a computer readable storage medium.

In another embodiment, a computer implemented method for guaranteeing a number of impressions utilizing a non-guaranteed mechanism for targeted advertising is provided. The method includes receiving a request for supplying a bid for an ad impression; and submitting a bid value in response to receiving the request. The submitting includes identifying a minimum bid value based on a ratio of guaranteed ad impressions to expected remaining ad impressions; and setting the minimum bid value to the bid value. The method identifies a highest bid value from all received bid values and allocates the ad impression to an owner of the highest bid value. The ad of the owner of the received bid is then displayed. The bid history is revised based on the success or failure of the submitted bid value so that subsequently received request for supplying a bid can be computed with the most current data. In one embodiment, an ad bidder receives the request and submits the bid value based on the above described ratio to an ad exchange, which then identifies the highest bid value. The ad exchange communicates the winning bid value to the ad bidder so that the ad bidder can revise the bid history.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe a method and apparatus for determining maximum revenue from a fixed set of advertising impressions. It will be obvious, however, to one skilled in the art, that the present invention may be practiced without some or all of these specific details. In other instances, well-known operations have not been described in detail in order not to unnecessarily obscure the present invention.

The embodiments described herein provide techniques for intelligently allocating remnant advertising impressions in order to maximize the revenue received for the advertising impressions, while fulfilling contractual obligations for displaying advertising impressions for a plurality of advertisers. In the embodiments described below the publisher's revenue is maximized by determining a distribution model or type for the total available advertising impressions. The distribution model may be pre-processed and stored initially, in one embodiment. In another embodiment, the distribution model may be calculated on the fly, and in additional embodiments, the distribution model is recalculated and may change with each recalculation. Thus, the distribution model is continually recalculated over time as the advertising impressions are delivered to publisher's websites in order to intelligently distribute the ads for differing and possibly even overlapping segments and commitments. This continual recalculation of the distribution model enables the calculation of a minimum bid cost per thousand impressions (CPM) so that a determination of whether to serve a premium ad impression or a remnant ad impression may be made in a manner that maximizes the publisher's revenue.

Figure 1:
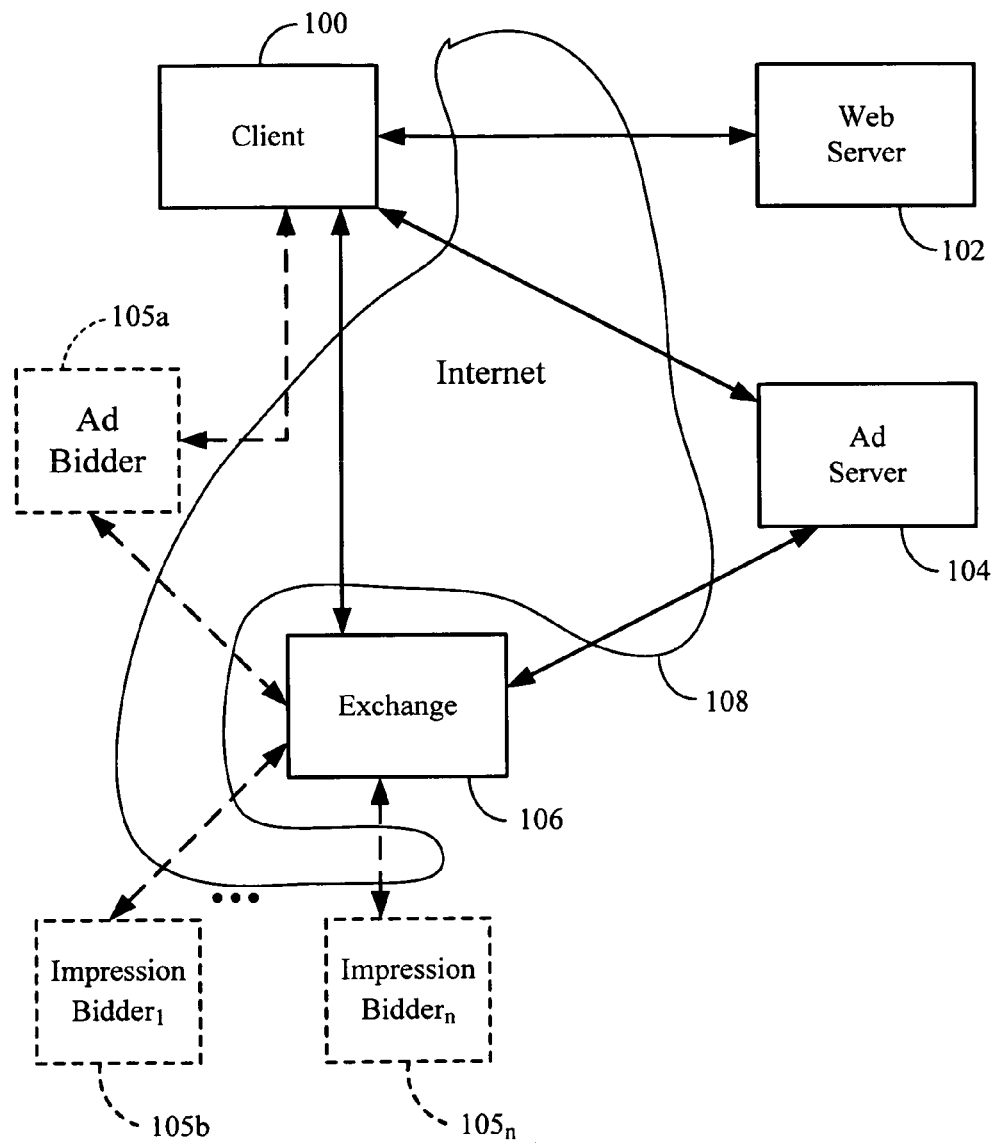
FIG. 1 is a simplified schematic illustrating the system architecture for implementing the maximization of publisher revenue in accordance with one embodiment of the invention.

FIG. 1 is a simplified schematic illustrating the system architecture for implementing the maximization of publisher revenue in accordance with one embodiment of the invention. In the system of FIG. 1, client 100, Web server 102, advertisement server 104, and exchange server 106 are each in communication through the Internet 108. In one embodiment, each of modules 102 through 106 is a server. Client 100 may be any computing device capable of presenting a web page and accessing Internet 108. Within the architecture of FIG. 1, client 100 may request a page from Web server 102. Web server 102 may be an Internet service provider (ISP) in one embodiment. In response to the request for a page, Web server 102 provides the page to client 100. Within the provided page may be a request for an advertisement, also referred to herein as an ad. Client 100 will then request an advertisement from ad server 104. Ad server 104 includes the logic to select which advertisement is provided to client 100 as described further below in one embodiment. One skilled in the art will appreciate that the logic for accomplishing the functionality described herein may be software, hardware, or a combination of software and hardware. Ad server 104 can provide the ad for display to the client or the ad server may provide a set of instructions to retrieve the ad. In one embodiment, the set of instructions are provided as Hyper Text Markup Language (HTML). It should be appreciated that while the embodiment of FIG. 1 illustrates a computing device as the client, the embodiments can be extended to television, video games, etc. In essence, the embodiments may be applied to any targeted advertising scheme where ad impressions are to be delivered.

In an alternative embodiment, the publishers may provide the entire inventory of ad impressions to ad exchange 106, and the need for ad server 104 can be eliminated or reduced. In this embodiment, ad bidder 105a submits bids to exchange 106. Ad bidder 105a contains the logic described below, as either hardware or software, so that the bid value submitted to exchange 106 is the minimum bid as described in more detail below. Exchange 106 broadcasts a request for bids to a plurality of ad/impression bidders 105a-105n. Ad bidder 105a is a mechanism on the publisher's side to submit bids for guaranteed ads that publish. Ad bidder 105a contains the logic described with regard to FIGS. 3 and 4 in order to guarantee that exchange 106 selects the highest bid, whether it is the minimum bid value set by the ratio and distribution model described below or a bid value from one of the other impression bidders 105b-105n that is greater than the minimum bid value. Thus, ad bidder 105a bids high enough to satisfy the guarantees while operating under the condition that exchange 106 simply selects the highest bid in one embodiment. Ad bidder 105a receives feedback from exchange 106 to enable the ad bidder to build the distribution model and to update the distribution model throughout a time period or continuously. The actual ad for the ad impression may be served by the ad bidder or the exchange server. Accordingly, this embodiment enables the elimination of ad server 104. It should be appreciated that in one embodiment, ad exchange 106 may implement the minimum bid through setting a floor price, or reserve price, below which the ad impression will not be sold, where this floor price is communicated to the other bidders on the exchange.

The embodiments described herein enable ad server 104 to provide an intelligent choice in order to maximize the revenue realized for the publisher of the page provided to client 100. One skilled in the art will appreciate that ad server 104 may be managed or controlled by an ecommerce company, such as DoubleClick, etc. Ad server 104 may be in communication with exchange server 106. In one embodiment, exchange server 106 operates as an advertisement exchange in which bids are received in response to a broadcast request and the bids are evaluated in order to fulfill advertisement availability on web pages, as mentioned above. Exchange server 106 may provide ad server 104 with an acknowledgment of a winning bid for a particular ad, which is then served to client 100 in one embodiment. Optionally, exchange server 106 may communicate the winning ad directly to client 100. It should be appreciated that the exchange server is optional for the embodiments where the ad server contains the revenue maximizing logic, and the ad server is optional for the embodiments where the ad bidder performs the bidding to the exchange server.

Through the embodiments described herein a method performed through the architecture described with regard to FIG. 1 enables a logical choice of whether to choose between guaranteed and remnant ad impressions for fulfilling an ad request. It should be appreciated that online publishers have control over ad impressions, which they create through placements on their content, or buy from other sources. These ad impressions can be differentiated by the content they appear on, characteristics of the audience that is viewing them, or other factors. Advertisers buy these impressions, using a variety of techniques that vary the risk between the advertiser and the publisher. Some of the more common buying methods include: exclusive placements, guaranteed impression purchases, per impression bidding, and cost per click or cost per action. Advertisers often purchase a guaranteed number of impressions over a specified period of time, for a fixed price. Publishers are happy to accommodate this purchasing technique because the publisher can typically command a premium price to provide these guarantees. Today, most publishers choose to serve their guaranteed impression buys first, to ensure they meet their commitments, and then the remainder of their inventory can be bid out to the highest bidder.

In the embodiments described below an optimal daily impression goal for each guaranteed order, for every segment is calculated. As used herein, a segment may be thought of as a unique permutation of target criteria, including both contextual and audience. For each segment a mean bid CPM and a CPM variance is maintained. A minimum bid CPM is calculated and recomputed as the orders are fulfilled over a time period. In one embodiment, if a buyer bids above the minimum bid CPM then the buyer, e.g., ad provider, receives the impression. Otherwise, the impression is allocated to one of the guaranteed orders, i.e., the premium advertising impressions. It should be appreciated that this ensures both maximum value is captured from the highest bidders, and also that the daily guarantee is met.

In one embodiment, as each impression is considered, the impression is also presented to the bidders, and the highest bid CPM is selected for comparison. At the same time, the matching segment is examined and the ratio of guaranteed allocated impressions to expected remaining impressions is computed. If this ratio is greater than or equal to one (or some threshold value), then the highest bid offer is discarded, and the impression is allocated to one of the guaranteed orders in order to meet the commitment for the premium impressions. Otherwise, the minimum bid CPM is computed, by applying a distribution model to the mean bid CPM and the CPM variance, as illustrated in more detail below. A determination is then made as to where on the distribution curve the ratio of guaranteed allocated impressions to expected remaining impressions falls. If the minimum bid CPM is lower than the highest bid CPM, then the bidder wins the impression. Otherwise, the impression is allocated to one of the guaranteed orders.

It should be appreciated that the minimum bid CPM can be calculated in a variety of ways, based on the data. One example utilizes a normal distribution as mentioned above. In one particular example provided for illustrative purposes, if the mean bid CPM is four dollars, the CPM variance is four, and the ratio of allocated to remaining is 68%, then the minimum bid CPM would be six dollars. In a normal distribution, the variance is the square of the standard deviation, so in the above exemplary scenario the standard deviation would be two dollars. Further, in a normal distribution about 68% of the occurrences are less than one standard deviation above the mean. Thus, with this example 68% of the impressions are below six dollars, and the rest of the impressions are above six dollars. One skilled in the art would appreciate that for alternative distribution models, this calculation would differ, yet the desired output would be obtainable in a manner similar to the illustration for the normal distribution model, with changes made to the mathematical details as demanded by the distribution model.

Figure 2A:
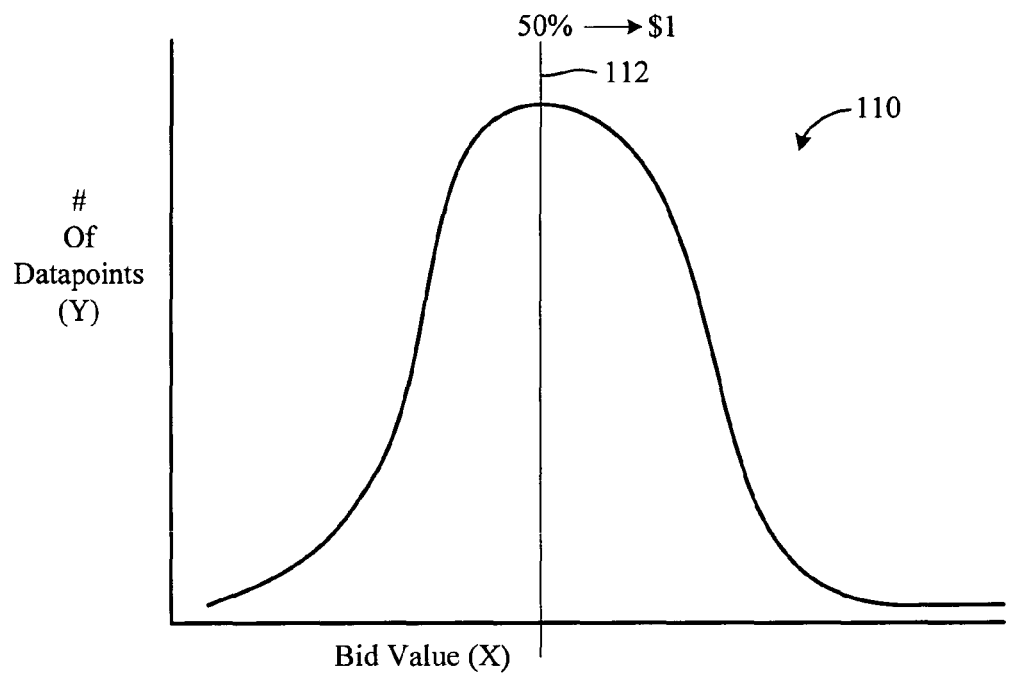
FIGS. 2A and 2B are simplified schematic diagrams for a normal distribution model being utilized to maximize publisher revenue in accordance with one embodiment of the invention.
Figure 2B:
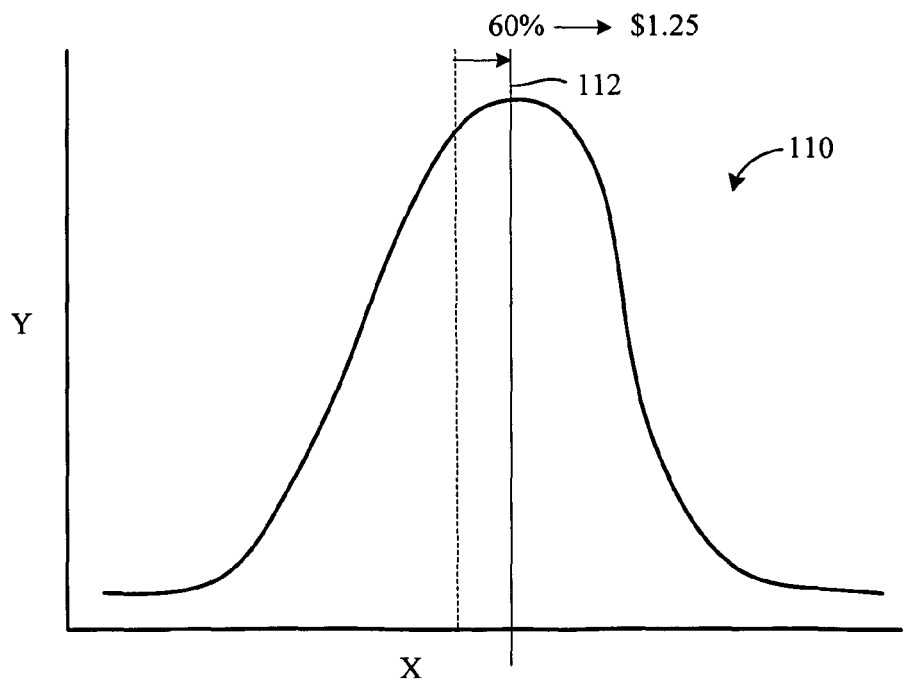

FIG. 2A is a simplified schematic diagram for a normal distribution model being utilized to maximize publisher revenue in accordance with one embodiment of the invention. Distribution curve 110 depicts a normal distribution, and line 112 designates a location where 50% of the values for the ad impressions are above the minimum bid cost per thousand and 50% of the values for the ad impressions are priced below the minimum bid cost per thousand. In the example illustrated by FIGS. 2A and 2B, the following exemplary parameters are provided for illustrative purposes and are not meant to be limiting. In the illustrative example, it is expected that 10,000 ad impressions will be delivered to the particular segment, e.g., a sports segment. The allocated or guaranteed portion is 5000 ad impressions with the remaining 5000 ad impressions being categorized as remnant impressions. It should be appreciated that the allocated or guaranteed portion represents the premium ad impressions. Thus, initially line 112 illustrates where 50% of the impressions are on each side of line 112. At halfway through the time period, which may be a day or any other suitable time period, it is calculated that 2000 of the guaranteed ad impressions have been served. However, it is expected that 2500 of the guaranteed ad impressions would have been served at the halfway point (5000/2). Accordingly, 3000 remaining guaranteed impressions have to be served of the 5000 guaranteed impressions. This ratio is 60% and line 112 moves from the 50% position to the 60% position as illustrated in FIG. 2B. It should be noted that at the 50% position a one dollar bid is set for the minimum cost per thousand. In order to ensure that more guaranteed ad impressions are served, the minimum bid CPM is raised to $1.25, as a result of the change from the 50% ratio position to the 60% ratio position on distribution curve 110. The embodiments described herein provide for constant recalculation of the ratio of the guaranteed impressions being served and the expected guaranteed impressions for a particular time. This ratio results in adjustment of the point along the distribution curve, which in turn adjusts the minimum bid CPM, in order to maximize publisher revenue for the remnant impressions while meeting commitments for the premium ad impressions.

Figure 2C:
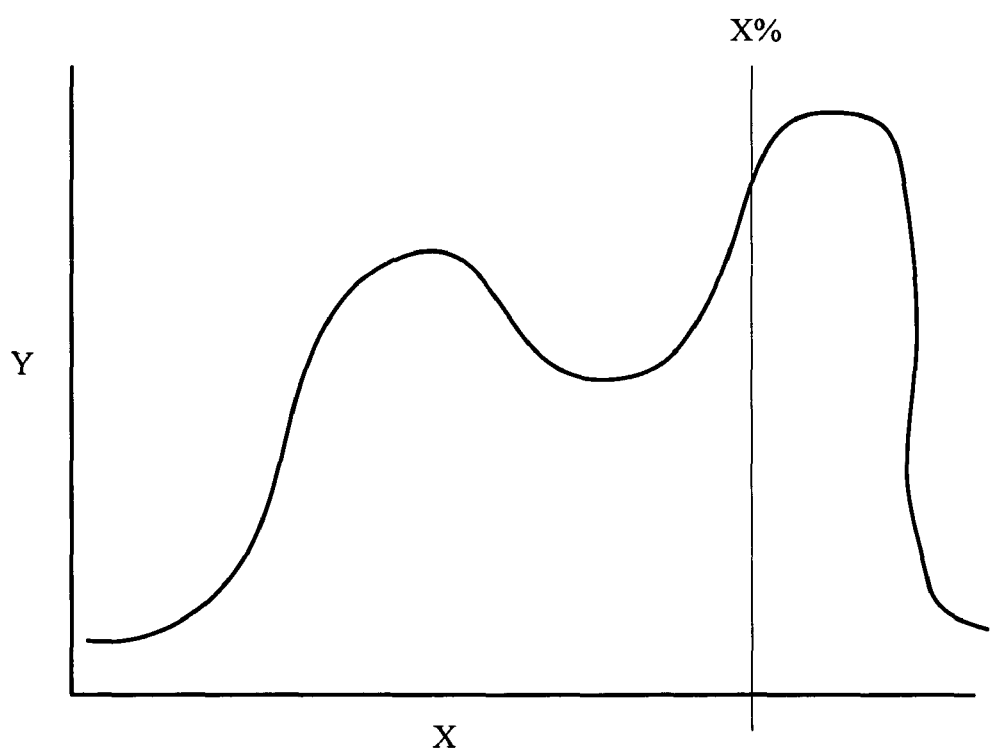
FIG. 2C is a simplified schematic diagram for an alternative distribution model then the normal distribution models of FIGS. 2A and 2B.

FIG. 2C is a simplified schematic diagram for an alternative distribution model then the normal distribution models of FIGS. 2A and 2B. The distribution model of FIG. 2C can be an initial distribution model that is calculated for the particular segment or the distribution model may result from a recalculation of a different previous distribution model, e.g., a normal distribution model. As the time period progresses, the recalculation of the distribution model, based on the past history of the ads served for the ad impressions, may result in a normal distribution or any other non-normal distribution type. One skilled in the art will appreciate that a curve fitting model applied to the bid value data yields the distribution model where the variance, mean and other parameters can be generated from the distribution model. In addition, one skilled in the art will appreciate that a mathematical distribution formula is not the only way to represent the distribution of prices across a spectrum, and that another embodiment may simply sample or census the data points over history and compute the bid by finding the value such that some percentage of all bids were below that value. As used herein, distribution model, distribution type, distribution sample, and census are interchangeable.

Figure 3:
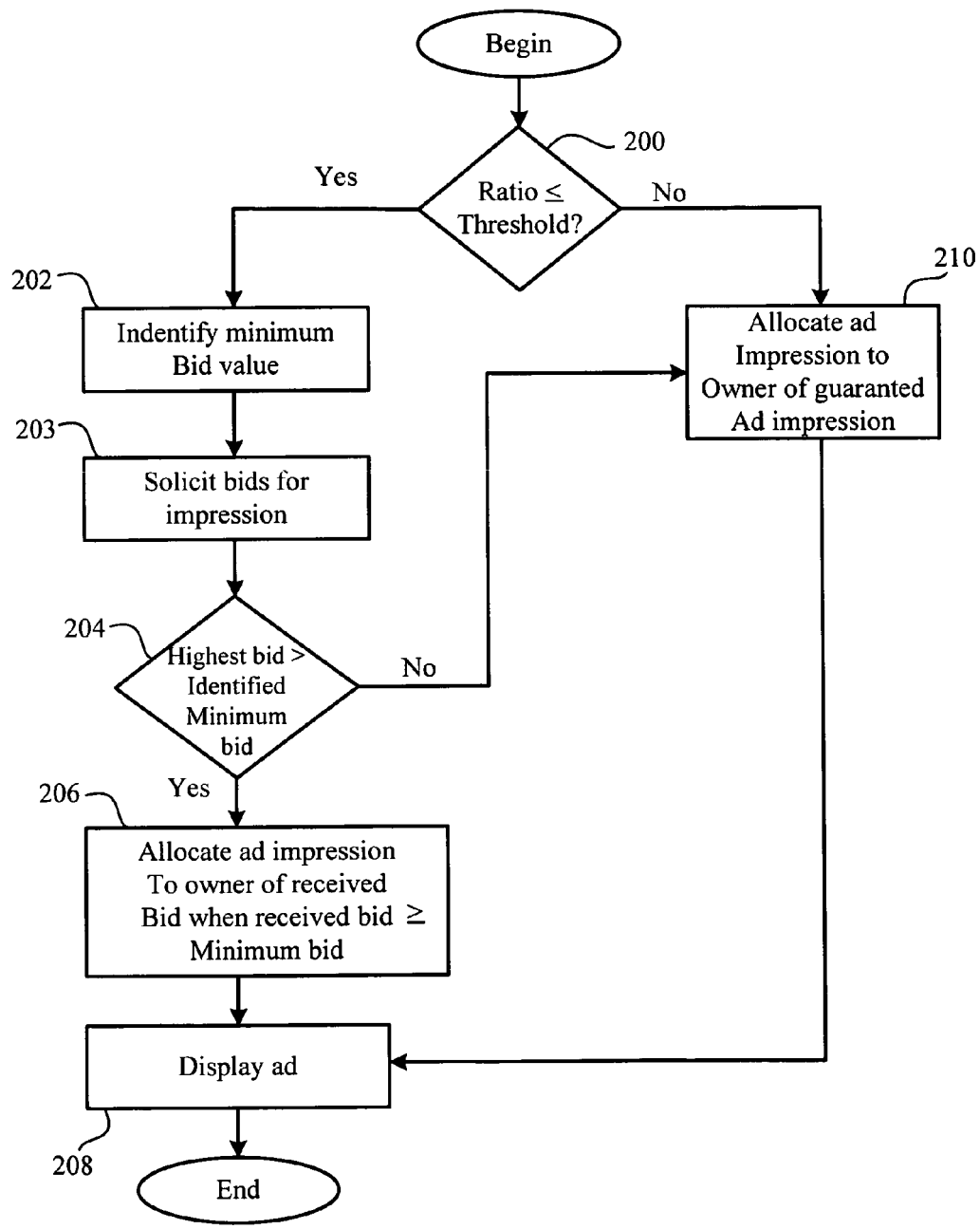
FIG. 3 is a flow chart diagram illustrating a method for maximizing publisher revenue for online advertising impressions in accordance with one embodiment of the invention.

FIG. 3 is a flow chart diagram illustrating a method for maximizing publisher revenue for online advertising impressions in accordance with one embodiment of the invention. The method initiates with operation 200 where it is determined if the ratio of guaranteed ad impressions to expected remaining ad impressions is less than or greater than a threshold value. As discussed above, with regard to FIGS. 2A-2C, this ratio may be continually recalculated, which results in adjustment of a minimum bid CPM. It should be appreciated that the threshold value may be represented by a ratio of the expired time over the total time for the time period in one embodiment. In another embodiment, the threshold value may be set to one. If the ratio is less than the threshold value, the method proceeds to operation 202 where a minimum bid value is identified. The minimum bid value is based on the ratio as discussed above, i.e., minimum bid CPM, in the example provided with reference to FIGS. 2A and 2B. In operation 203, bids are solicited for the ad impression. The method then advances to decision operation 204 where the minimum bid value is compared to each received bid value for an ad impression and where it is determined if the highest bid value is greater than the identified minimum bid value. If the highest bid value is greater than the identified minimum bid value, then the method advances to operation 206, the details of which are described below. Otherwise, the method proceeds to operation 210, where the ad impression is allocated to an owner of the guaranteed ad impressions. In one embodiment, the received bid value may be from an ad exchange server. In another embodiment, the received bid value may be the highest bid from a plurality of bids which may be received or generated from an ad server.

Still referring to FIG. 3, the ad impression is allocated to an owner of the received bid when the received bid value is greater than or equal to the minimum bid value as illustrated in operation 206. Otherwise, the ad impression is allocated to an owner of the guaranteed ad impressions. In operation 208 the ad of the owner of the received bid is displayed on the client requesting the page when the received bid value is greater than or equal to the minimum bid value. One skilled in the art will appreciate that the ad can be any type of ad provided to a computing device, video presentation device, such as a television, etc., for presentation on the display of the device/client. One skilled in the art will appreciate that an ad impression may include an ad appearing on a web page, or within a video, or in a mobile application, or any type of engagement of a user with an advertisement. If the ratio is greater than the threshold in operation 200 the message advances to operation 210 where the ad impression is allocated to an owner of the guaranteed ad impressions. Thus, in this instance, the distribution of the premium ad impression is falling behind, as determined by the comparison of the ratio the threshold value, therefore, the guaranteed ad impressions are served until the ratio is less than the threshold.

Figure 4:
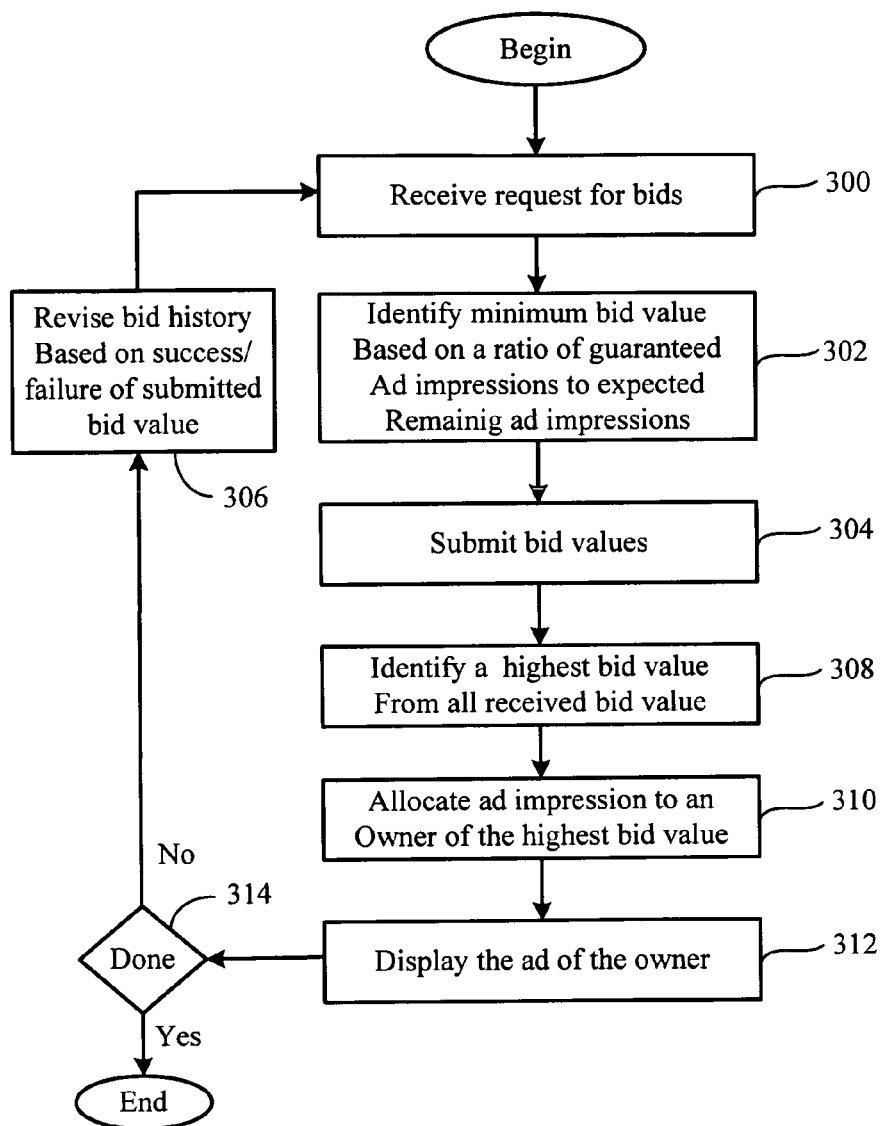
FIG. 4 is a flow chart diagram illustrating the method operations for maximizing publisher revenue for online advertising in accordance with an alternative embodiment of the invention.

FIG. 4 is a flow chart diagram illustrating the method operations for guaranteeing a number of impressions utilizing a non-guaranteed mechanism for targeted advertising in accordance with an alternative embodiment of the invention. The method initiates with operation 300 where a request is received for supplying a bid value for an ad impression. The request may be broadcast from an ad exchange as discussed above with reference to FIG. 1. As mentioned above, the request may be for an advertisement to be displayed on a webpage or a video capture device, such as a television. In one embodiment, the request is in response to a request from the client device or an ad bidder for supplying an advertisement for an ad impression. In operation 302 a minimum bid value is identified. The minimum bid value is based on the ratio as discussed above, i.e., minimum bid CPM, in the example provided with reference to FIGS. 2A, 2B, and FIG. 3. In operation 302 the minimum bid value is set to the bid value and transmitted to the exchange server. Thus, the ad bidder utilizes the logic described above with reference to FIG. 3 in order to control the minimum bid price awarded by the exchange, in one embodiment. That is, the ad bidder has feedback from the ad exchange, e.g., from operation 306, on the bid value history, as well as the obligations/commitments for the publisher to compute the distribution model and minimum bid CPM, as described above to control the awarding of the bid to meet the obligation/commitments. In operation 304, a bid value is submitted in response to the request for bid values. A plurality of bid values may be received by the ad exchange.

In operation 308 of FIG. 4, the bid value is received by the ad exchange along with any other bid values from other impression bidders and/or ad servers. The highest bid value is identified in operation 308. As a consequence of the ad bidder providing a minimum bid value, the exchange allocates the ad impression for at least the minimum bid value so that the publisher's revenues are maximized as illustrated in operation 310. In operation 312 the ad of the owner of the received bid is presented on a display of a computing device/client/video capture device requesting the ad for the ad impression. The method proceeds to operation 314 where it is determined if the method continues. If the method continues, the bid history is revised based on the success or failure of the submitted bid value. For example, in one embodiment, if the bid failed, then the ad may have been served to an owner of a guaranteed ad impression. Similarly, if the bid was successful, then a remnant impression was served. In either event the ratio is impacted by the bid history. One skilled in the art will appreciate that the ad bidder may perform the functionality described in operations 300, 302, 304, and 306, while an ad exchange may perform the operations described in operations 308-314. However, this embodiment is exemplary and not meant o be limiting as the functionality may be split between the ad bidder and the ad exchange in any suitable manner. It should be further appreciated that the embodiments may be integrated into the embodiments of U.S. application Ser. No. 11/743,962, to further enhance the distribution of premium ad impressions among different segments. In one embodiment, the advertisements may be prioritized according to U.S. application Ser. No. 11/743,962.

In summary, the above described embodiments provide a method and apparatus for maximizing publisher revenue for remnant advertising impressions. As discussed above the embodiments may be incorporated into an ad server in one embodiment and may or may not include an exchange server. The mechanism described above may be integrated into an ad server through software stored in memory o through firmware, i.e., a combination of hardware and software, integrated into the ad server. The ad bidder embodiments may be similarly configured as software stored in memory of a computing device having internet access or as firmware integrated into the computing device. The ad bidder can be a component of a computing device controlled by the publisher in one embodiment. However, this is not meant to be limiting as one skilled in the art will appreciate that the ad bidder and corresponding functionality may be a stand-alone device or a component of a computing device.

In addition to the normal distribution described above alternatives distribution models may be incorporated with the embodiments. Further optimizations may be provided for the embodiments described above, such as calculating the mean and variance for each guaranteed order, instead of each segment. In this embodiment, much less data is required to be maintained because there may be 1 million segments in only thousands of orders. In another embodiment the segments that have only a very few impressions may be rolled up into product's, where product is defined as a set of target criteria used by one or more orders. It should be appreciated that the embodiments described above do not require the use of the actual order CPM for the guaranteed impression orders. In one embodiment, if the minimum bid CPM is substantially higher than the actual CPM of the guaranteed order, the publisher may be willing to relax the guarantee in order to make more short-term revenue. While this may further increase revenue, the decision may hinge on the remaining time left for the guaranteed order, and the importance of the buyer.

One skilled in the art will appreciate that the embodiments may be employed in the absence of any guaranteed inventory. With respect to the floor price concept, the publisher sets floor prices at a level to maximize revenue, even if the publisher doesn't have any other revenue-generating ads to place if the floor is not met. For example, the publisher may get 100% fill if the floor is set at $1, but 70% fill at a floor of $2. If most bids are close to the floor, then the publisher would rather set the bid to $2 and get more overall revenue. The algorithm for implementing this includes setting the floor price fairly low initially (and even constraining the floor price within a range manually by the publisher). For each segment, a trailing average CPM is computed, and the floor is adjusted up or down to maximize that CPM. This adjustment could occur every impression, or less often, as desired. The algorithm for deciding when to adjust and by how much could vary depending on the traffic. In one embodiment, the trend line of the average CPM changes and is tracked. Thus, if the CPM is trending up, the floor price is adjusted up until the CPM starts to trend down and then the floor price is adjusted down. The amount of the adjustment may be based on the difference between the latest trend line value and the current CPM in one embodiment. In another embodiment, the adjustment of the initial minimum value may be based on other external data, such as seasonal historical values or industry-wide ad purchase data, which may or may not be used in conjunction with the trending of the bid values.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

With the above embodiments in mind, it should be understood that the invention might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for maximizing publisher revenue for targeted advertising, comprising:
    determining a ratio of guaranteed ad impressions to expected remaining ad impressions, wherein the guaranteed ad impressions have a set cost and wherein a cost of each ad impression of the expected remaining ad impressions varies;
    if the ratio is less than a threshold value, the method includes,
        identifying a minimum bid value, the minimum bid value based on the ratio;
        comparing the minimum bid value to a received bid value for an ad impression;
        allocating the ad impression to an owner of the received bid when the received bid value is greater than or equal to the minimum bid value; and
        displaying an ad of the owner of the received bid.

2. The method of claim 1, further comprising:
    allocating the ad impression to the owner of the guaranteed ad impressions when one of the received bid value is less than the minimum bid value or if the ratio is greater than the threshold.

3. The method of claim 1, wherein each method operation is performed in real time through an ad server and wherein the received bid value is a highest bid value selected from a plurality of received bid values.

4. The method of claim 1, wherein identifying a minimum bid value includes, applying the ratio to a normal distribution of bid values for all ad impressions.

5. The method of claim 4, wherein all ad impressions include the guaranteed ad impressions and non-guaranteed ad impressions.

6. The method of claim 1, further comprising:
    recalculating the ratio for each request for an ad to be displayed.

7. The method of claim 1, wherein identifying a minimum bid value includes,
    maintaining a distribution sample of bid values of all ad impressions;
    identifying a bid value of the distribution sample correlated to the ratio, the bid value determining the minimum bid value; and
    recalculating the ratio after allocating the ad impression to one of the owner of the received bid or the owner of the guaranteed ad impressions.

8. The method of claim 7, further comprising:
    updating the distribution sample after allocating the ad impression; and
    repeating the identifying the bid value and the recalculating the ratio for the updated distribution type.

9. The method of claim 8, further comprising:
    maintaining a history of bid values and corresponding allocations resulting from the history of bid values, wherein the updated distribution sample is defined through the history of bid values and wherein the updated distribution sample is different from the distribution sample of bid values.

10. A computer implemented method for guaranteeing a number of impressions utilizing a non-guaranteed mechanism for targeted advertising, comprising:
    receiving a request for supplying a bid for an ad impression;

submitting a bid value in response to receiving the request, the submitting including,
identifying a minimum bid value based on a ratio of guaranteed ad impressions to expected remaining ad impressions, wherein each ad impression of the guaranteed ad impressions have a set cost and wherein a cost of each ad impression of the expected remaining ad impressions varies;
setting the minimum bid value to the bid value;
identifying a highest bid value from all received bid values; and
allocating the ad impression to an owner of the highest bid value; and
displaying an ad of the owner of the received bid.

11. The method of claim 10, wherein each method operation is performed in real time for displaying the ad within a browser of a computing device.

12. The method of claim 10, wherein identifying a minimum bid value includes, applying the ratio to a normal distribution of bid values for all available ad impressions within a segment.

13. The method of claim 10, wherein the identifying includes, maintaining a distribution type of bid values of all ad impressions within a particular segment;
identifying a bid value of the distribution type correlated to the ratio, the bid value determining the minimum bid value; and
recalculating the ratio after allocating the ad impression.

14. The method of claim 13, further comprising:
updating the distribution type after allocating the ad impression.

15. The method of claim 10, wherein the identifying the highest bid and the allocating the ad impression are performed through an ad exchange, while the receiving and the submitting are performed by an ad bidder in communication with the ad exchange and wherein the ad bidder is one of a plurality of ad bidders in communication with the ad exchange.

16. The method of claim 14, wherein the updating the distribution type includes, capturing a history of bid values for the particular segment; and
applying a curve fitting model to the history of bid values, wherein output of the curve fitting model is associated with a different distribution type.

17. A computer implemented method for maximizing publisher revenue for targeted advertising, comprising:
setting an initial minimum value;
allocating ad impressions to bids exceeding the initial minimum value, wherein
the bids are variable;
displaying the ad impressions for the bids exceeding the initial minimum value;
tracking the bid values of ad impressions over a time period;
adjusting the initial minimum value according to the tracking;
allocating subsequent ad impressions to bids exceeding the adjusted minimum value; and
displaying the ad impressions for the bids exceeding the adjusted initial minimum value.

18. The method of claim 17, wherein the tracking the bid values includes, trending an average cost per unit of ad impressions over the time period for the initial minimum value, and wherein the adjusting the initial minimum value includes, adjusting the initial minimum value according to a direction determined by the trending.

19. The method of claim 18, further comprising:
increasing the initial minimum value when the trending is increasing; and
decreasing the initial minimum value when the trending is decreasing.

20. The method of claim 19, wherein one of the increasing or decreasing is performed by an amount proportional to a change in the trending for the time period.

21. The method of claim 17, wherein each method operation is embodied as computer instructions on a computer readable medium.

22. A computer implemented method for maximizing publisher revenue for targeted advertising, comprising:
setting an initial minimum value;
allocating ad impressions to bids exceeding the initial minimum value, wherein the bids are variable;
displaying the ad impressions for the bids exceeding the initial minimum value;
tracking the bid values of ad impressions over a time period;
adjusting the initial minimum value according to one of the tracking or external data;
allocating subsequent ad impressions to bids exceeding the adjusted minimum value; and
displaying the ad impressions for the bids exceeding the adjusted initial minimum value.

* * * * *